United States Patent [19]

Runkle et al.

[11] 4,281,585
[45] Aug. 4, 1981

[54] HYDRAULIC BRAKE BOOSTER AND VALVE MEMBER

[75] Inventors: Dean E. Runkle, LaPorte; Louis S. Tang, Mishawaka, both of Ind.; Gregory K. Harrison, Niles, Mich.

[73] Assignee: The Bendix Corporation, Southfield, Mich.

[21] Appl. No.: 112,508

[22] Filed: Jan. 16, 1980

Related U.S. Application Data

[63] Continuation of Ser. No. 885,825, Mar. 13, 1978, abandoned.

[51] Int. Cl.³ .................. F15B 13/10; F01B 25/02
[52] U.S. Cl. ............................. 91/5; 91/6; 91/391 R; 92/81
[58] Field of Search ............. 91/5, 6, 391 R; 92/81; 60/548, 582, 585, 589, 593, 413, 418

[56] References Cited

U.S. PATENT DOCUMENTS

| | | | |
|---|---|---|---|
| 2,638,075 | 5/1953 | Towler | 92/81 |
| 3,447,421 | 6/1969 | Pelouch | 92/81 |
| 3,633,363 | 1/1972 | Larsen | 91/6 |
| 3,677,007 | 7/1972 | Goscenski | 91/6 |
| 3,780,620 | 12/1973 | Gardner | 91/6 |
| 3,937,126 | 2/1976 | Grabb et al. | 91/6 |

Primary Examiner—Paul E. Maslousky
Attorney, Agent, or Firm—Paul David Schoenle; Ken C. Decker; Terry L. Miller

[57] ABSTRACT

A hydraulic brake booster includes a housing which defines a pressure chamber and a piston within the housing is movable in response to pressurized fluid within the pressure chamber to effectuate a brake application. The piston encloses a storage chamber and forms a passage communicating the storage chamber with the pressure chamber. A valve member is disposed within the passage to control communication between the storage chamber and the pressure chamber. An operator actuator cooperates with a control valve to communicate pressurized fluid to the pressure chamber and a finger is actuated by the operator actuator to engage the valve member, thereby opening communication between the storage chamber and the pressure chamber. The valve member comprises a unitary assembly having a sleeve sealingly engaging the wall of the piston passage, a seat member biased into engagement with a shoulder defined by a stepped bore on the sleeve, and a stem extending through a bore on the seat member.

14 Claims, 3 Drawing Figures

HYDRAULIC BRAKE BOOSTER AND VALVE MEMBER

This is a continuation of application Ser. No. 885,825, filed Mar. 13, 1978 now abandoned.

BACKGROUND OF THE INVENTION

In U.S. Application No. 722,956, a hydraulic brake booster includes a piston which is movable in response to pressurized fluid in a pressure chamber to initiate a braking application. In order to conserve space and weight, the piston is hollow to substantially define a storage chamber within the piston. If the pressure of the pressurized fluid within the pressure chamber is insufficient to move the piston during braking, the storage chamber is communicated to the pressure chamber to assist in moving the piston, thereby providing a power assist to the braking application. Generally, the storage chamber is communicated to the pressure chamber when a spool valve within the brake booster fails to communicate pressurized fluid to the pressure chamber, either because of an inoperable pressure source or the spool valve becoming wedged in the brake booster housing.

With the pressure source rendered inoperable, the communication of pressurized fluid to the pressure chamber form the storage chamber is required to provide a power assist to braking in order to bring a vehicle to a stop. Consequently, a reliable valve member which operates to communicate the storage chamber within the piston with the pressure chamber is believed to be an improvement in the state of the art. Moreover, during assembly it is desirable to remove only valve members which are not satisfactory without scrapping any other parts of the hydraulic brake booster.

SUMMARY OF THE INVENTION

The present invention relates to an improvement in a hydraulic brake booster wherein a piston encloses and defines a storage chamber. The hydraulic brake booster includes a housing defining a pressure chamber and supporting a control valve for communicating pressurized fluid to the pressure chamber. The piston is movable relative to the housing in response to an increase in the pressure of the pressurized fluid in the pressure chamber. The piston includes a plug which is exposed to the pressure chamber and a passage through the plug receives a valve member. A blind bore in the plug receives an operator actuator and the passage is radially spaced from and offset relative to the blind bore. The valve member comprises a unitary assembly for insertion within the passage, the unitary assembly including a sleeve with a stepped bore therethrough, a seat member biased against a shoulder formed by the stepped bore and a stem extending through a bore in the seat member.

In addition, the operator actuator includes a lever which engages a pin extending through an aperture in the plug. The pin carries a finger which is engageable with the valve member stem. When the pressure of the fluid within the pressure chamber is insufficient to move the piston to a braking position, the lever pivots to urge the finger via the pin into engagement with the stem. As the stem is moved relative to the seat member, the storage chamber is communicated with the pressure chamber to increase the pressure of pressurized fluid within the pressure chamber, thereby providing a power assist to braking.

It is a primary object of the present invention to provide a unitary assembly which is separate from the piston, but easily connected to the piston for controlling the communication of pressurized fluid from the pressure chamber to the storage chamber and vice versa.

DETAILED DESCRIPTION

Figure 1:
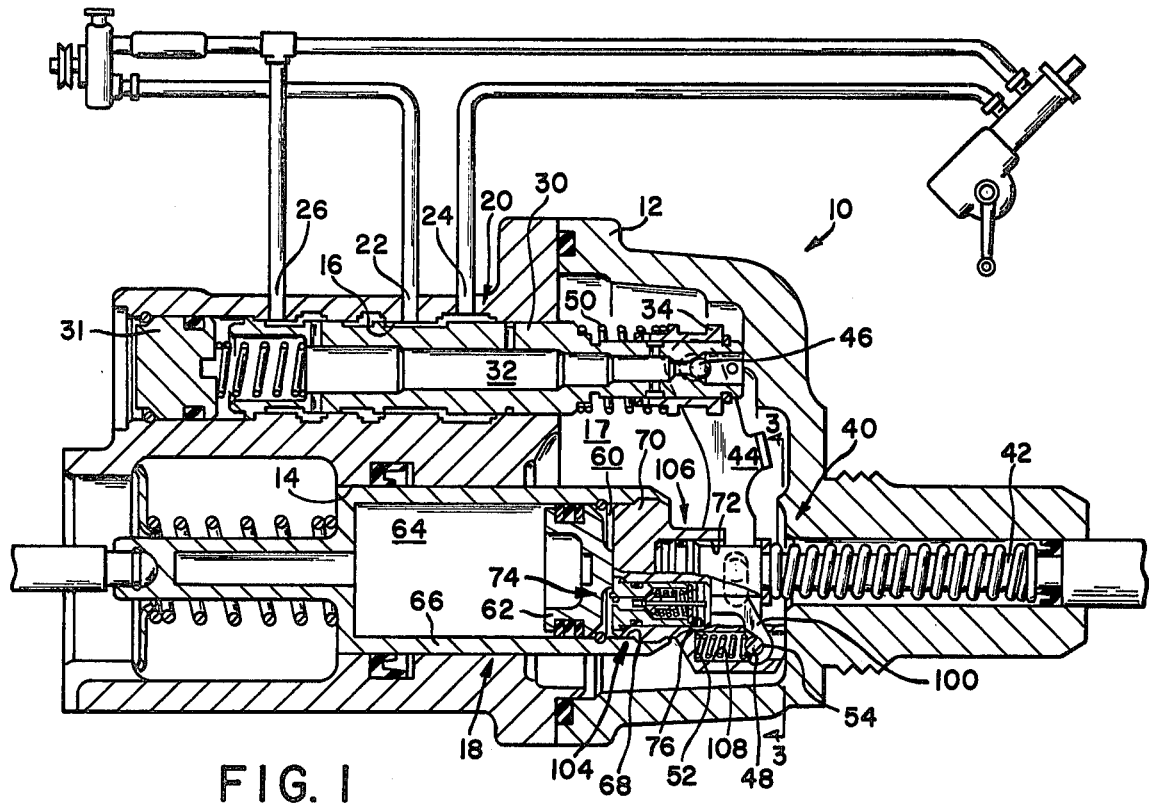
FIG. 1 is a schematic view of a brake system showing a side cross-sectional view of a hydraulic brake booster constructed in accordance with the present invention.

A hydraulic brake booster 10 provides a power assist during braking to increase the force applied to a master cylinder in a vehicle, thereby assisting an operator in stopping the vehicle. In the hydraulic brake booster of FIG. 1, a housing 12 includes a pair of bores 14 and 16 and substantially defines a pressure chamber 16. A piston 18 disposed in bore 14 is movable relative to the housing 12 in response to pressurized fluid within the pressure chamber 16. A conventional master cylinder (not shown) connects with the left side of the housing so that movement of the piston 18 causes the master cylinder to communicate brake fluid to a set of wheel cylinders (not shown) to initiate braking of the vehicle.

A control valve 20 disposed within housing bore 16 moves relative to the housing to cooperate with an inlet 22, an outlet 24, and a return 26, in order to control communication of pressurized fluid to the pressure chamber 16. The control valve preferably comprises a spool valve 30 with a passage 32 communicating with the pressure chamber 16. A sleeve 34 carried by the spool valve 30 is movable from a normal position to close the passage 32.

An operator actuator 40 comprises an input rod 42 and a lever 44. The lever is pivoted about a pin 46 on the sleeve 34 and about a pin 48 on the piston 18. A spring 50 biases the sleeve 34 and pin 46 to one end of the spool valve 30 and a spring 52 biases the pin 48 to one side of a transverse axially elongated aperture 54 on the piston 18. A pair of pins 47 connects the input rod 42 with the lever 44.

In accordance with U.S. Application Ser. No. 722,956, the piston 18 forms a storage chamber 60 internally of the piston 18. A diaphragm 62 separates the storage chamber 60 from a compressible medium 64 such that pressurized fluid communicated to the storage chamber 60 compresses the medium to maintain the storage chamber 60 under pressure. The piston 18 preferably comprises a stepped cylindrical casing 66 terminating in an open end 68 which receives a plug 70. The plug receives the input rod 42 in a blind bore 72 so that it is possible to manually move the piston 18 to a braking position by urging the input rod 42 into the blind bore 72 until the input rod abuts the bottom of the blind bore 72, whereupon further movement of the input rod transmits movement to the piston 18.

In accordance with the present invention, a valve member 74 is carried in a passage 76 in the plug 70. Viewing FIG. 2, the valve member 74 comprises a unitary assembly for easy assembly with the plug 70.

The unitary assembly includes a sleeve 78 with a stepped bore 80 therethrough defining a shoulder 82. A seat member 84 is biased into sealing engagement with the shoulder 82 by a spring 86 which is retained within the stepped bore 80 by a ring 88 secured to the sleeve 78. A tapered bore 91 extending through the seat member 84 receives a stem 90 with a head 92. The stem extends through a polygonal opening 94 in the ring 88 which supports the stem and permits communication between the stem and polygonal opening 94. When urged to the right in FIG. 2, the stem head 92 sealingly engages the seat member 84 and a plurality of tabs 96 on the sleeve 78 oppose the head 92 to define the left position of the stem head.

The lever 44 is pivotally mounted on the pin 48 which extends through the transverse axially elongated aperture 54. The pin 48 carries a finger 100 which is slidably mounted in an undercut slot 102 in the plug 70. The finger 100 opposes the stem 90, such that movement of the finger 100 to the left moves the stem 90 to the left also.

Figure 3:
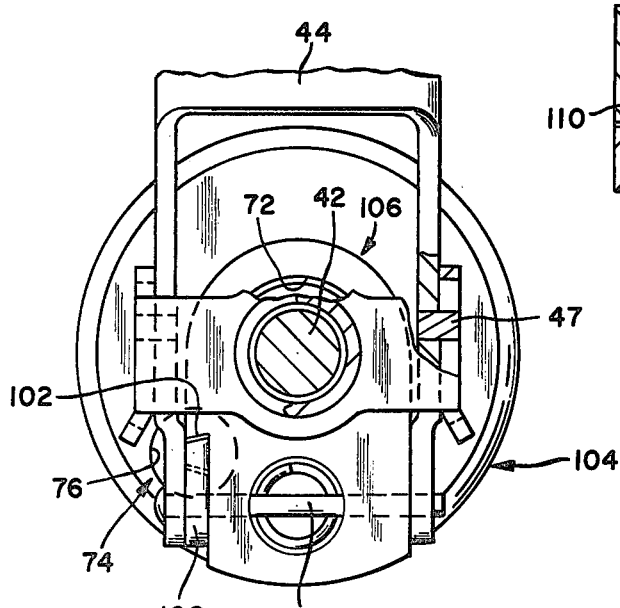
FIG. 3 is a fragmentary cross-sectional view taken along line 3—3 of FIG. 1.

Turning to FIG. 3, the valve member 74 is disposed to the left side of the blind bore 72 and radially below the centerline of the blind bore. The plug 70 includes an enlarged diameter portion 104 which sealingly engages the casing 66 at the open end 68 and a reduced diameter portion 106. The passage 76 extends through the enlarged diameter portion 104 and opens to the pressure chamber 16. The reduced diameter portion 106 forms the transverse axially elongated aperture 54 and includes a pocket 108 for receiving the spring 52 which biases the pin 48 and the finger 100 toward one end of the aperture 54. Moreover, the reduced diameter portion 106 extends from the bottom of the enlarged portion 104 and forms the blind bore 72 for receiving the input rod 42.

MODE OF OPERATION

The hydraulic brake booster 10 operates in a conventional manner to provide a power assist to a braking application. For example, when the input rod 42 is moved to the left to initiate braking, the connecting pins 47 cause the lever 44 to pivot about the pin 48 thereby moving the control valve 20 to open communication between the inlet 24 and the pressure chamber 16. Pressurized fluid communicated to the pressure chamber 16 imparts a force on the piston 18 to move the piston to the left, thereby actuating the master cylinder to communicate brake fluid to a wheel cylinder, which effectuates a braking application. With pressurized fluid communicated to the pressure chamber 16, the storage chamber 60 is charged if the pressure within the pressure chamber is greater than the pressure within the storage chamber. The pressure differential across the valve member 74 causes the stem 90 to be biased against the tabs 96 so that fluid is communicated through the opening 94, a slot 95 in the seat member 84, the clearance between the stem 90 and the bore 91 on the seat member, and the clearance between the head 92, and the stepped bore 80 in order to communicate the pressurized fluid to the storage chamber 60. If the pressure in the pressure chamber is less than that in the storage chamber, the head 92 is biased into sealing engagement with the seat member 84 to trap pressurized fluid in the storage chamber 60. If, during braking, the pressure of the pressurized fluid within the pressure chamber is insufficient to move the piston 18, further movement of the input rod 42 causes the pivoting lever 44 to move the spool valve 30 in abutment with a stop 31 and to move the sleeve 34 relative to the spool valve 30 thereby closing the passage 32. Continued movement of the input rod 42 pivots the lever about the pin 46 and urges the pin 48 and finger 100 to move against the spring 52. The finger 100 engages the stem 90 to move the stem head 92 away from the seat member 84, thereby opening communication between the storage chamber and the pressure chamber. Consequently, pressurized fluid is communicated from the storage chamber to the pressure chamber to create a force urging the piston to move to the left. Therefore, a power assist is provided during braking by the storage chamber, even though the control valve fails to communicate enough pressurized fluid to the pressure chamber.

If the pressurized fluid within the storage chamber 60 is exhausted after a few brake applications without the control valve operating properly, a brake applications is still possible, as continued movement of the input rod 42 abuts the latter with the bottom of the blind bore 72, so that movement of the input rod 42 imparts movement to the piston 18 to actuate the master cylinder.

When braking is terminated, the spool valve and sleeve return to their normal position to communicate the pressure chamber with the return 26 via passage 32. Consequently, if the pressure of the pressurized fluid within the storage chamber 60 increases due to heat or other means to a pressure above a predetermined value, the pressure differential across the stem and seat member causes the stem head and seat member to move against the spring 86 to open the storage chamber to the pressure chamber in order to relieve the increased pressure in the storage chamber. Because the pressure chamber is in communication with the return 26, the venting of increased pressure to the pressure chamber does not initiate braking, as the increased pressure communicated from the storage chamber to pressure chamber is communicated to the return via passage 32.

Because the valve member 74 is a unitary assembly, the valve member can be tested independently of the plug 70 so that defective valve members can be isolated before the plug and attached valve member are engaged with the casing 66 to form the piston 18.

Figure 2:
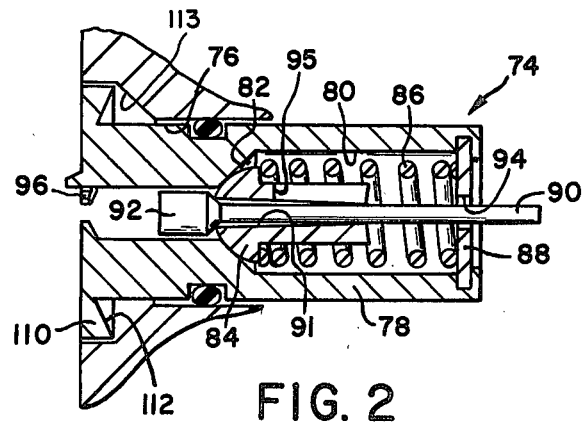
FIG. 2 is a side fragmentary cross-sectional view of the valve member used in the hydraulic brake booster of FIG. 1.

Viewing FIG. 2, the sleeve 78 terminates in a flange 110 which forms a tapered side edge 112. The axial width of the flange is narrower at the junction with the sleeve and the passage 76 is tapered at the end 113 receiving the valve member 74 so that an excessive buildup of pressure within the storage chamber coupled with a malfunction of the venting of the storage chamber causes the flange 110 to deform in response to the force of the excessive pressure in the storage chamber. The flange deforms to engage the tapered side edge 112 with the tapered passage portion 113 thereby moving the valve member to the right. This movement urges the stem 90 into engagement with the finger 100 to move the stem away from the seat member 84 in order to vent the excessive buildup of pressure within the storage chamber to the pressure chamber.

Although many variations of the present invention are possible by one skilled in the art, it is intended that these variations are included within the scope of the appended claims.

I claim:

1. In a hydraulic brake booster having a housing defining a pressure chamber, a piston mounted in the housing and movable relative to the housing in response to the pressure in the pressure chamber, the piston defining and enclosing a storage chamber and a passage connecting said storage chamber with said pressure chamber, a control valve mounted in the housing, an operator actuator cooperating with the control valve to communicate pressurized fluid to the pressure chamber, and a valve member carried by the piston within said passage and communicating pressurized fluid from the pressure chamber to the storage chamber via said passage, the improvement wherein said valve member is movable relative to said piston to open fluid communication from said storage chamber to said pressure chamber, a finger member carried by the operator actuator and slidably movable on said piston and pivot piston, said finger member being engageable with said valve member to move the latter relative to said piston, said operator actuator cooperating with said finger member to urge said finger member into engagement with said valve member to control the communication of pressurized fluid from the storage chamber to the pressure chamber.

2. The hydraulic brake booster of claim 1 in which said operator actuator includes a lever which pivots relative to said piston in a first position and pivots relative to said control valve in a second position, said lever urging said finger member into engagement with said valve member when said lever pivots in the second position.

3. The hydraulic brake booster of claim 2 in which said piston includes an enlarged diameter portion and a reduced diameter portion, and said passage extends through the enlarged diameter portion to communicate the storage chamber with the pressure chamber, and said finger member being movably supported by said lever adjacent the reduced diameter portion.

4. The hydraulic brake booster of claim 2 in which said lever includes a pin and said piston includes an aperture for receiving said pin, said finger supported on said pin.

5. The hydraulic brake booster of claim 4 in which the aperture includes an axial dimension which is greater than the radial dimension of the aperture to permit said pin to move axially in the aperture, said pin being resiliently biased axially to one side of the aperture.

6. The hydraulic brake booster of claim 3 in which the passage terminates in a slot and said finger is movably disposed in the slot.

7. In a hydraulic brake booster having a housing defining a pressure chamber, a control valve mounted in the housing for communicating pressure to the pressure chamber, a piston disposed within the housing and moving relative to the housing in response to pressure communicated to the pressure chamber, the piston defining and enclosing a storage chamber and an operator actuator imparting movement to the piston when the pressure within the pressure chamber is below a predetermined value, the improvement in which a passage through the piston communicates the storage chamber with the pressure chamber and a valve member is disposed in the passage, said valve member comprising a sleeve sealingly engaging the wall of the passage, said sleeve having a stepped bore therethrough defining a shoulder, a seat member resiliently biased into engagement with the shoulder, and a stem extending through a bore in the seat member, said stem normally engaging the seat member to close the seat member bore and said seat member normally engaging the shoulder to close the sleeve stepped bore to normally close communication between the storage chamber and the pressure chamber.

8. In a hydraulic brake booster having a housing defining a pressure chamber, a movable piston mounted in the housing and defining a storage chamber within the piston, a control valve mounted in the housing, an operator actuator cooperating with the control valve during a brake application to communicate pressurized fluid to the pressure chamber, the piston being movable in response to fluid pressure within the pressure chamber and defining a passage communicating the pressure chamber with the storage chamber, and a valve member carried by the piston within said passage, the improvement in which said valve member includes a sleeve which is movably disposed within said piston passage, said sleeve and said piston defining cooperating abutments opposing movement of said sleeve toward said pressure chamber in response to pressurized fluid in said storage chamber, said sleeve being deformable when the pressure within the storage chamber is above a predetermined value to move said valve member toward said pressure chamber, and said valve member includes a stem which extends toward said pressure chamber and is movable relative to said sleeve to open communication between the pressure chamber and the storage chamber, said stem confronting an abutment-defining member which is carried by and moves with said piston, said stem contacting said abutment-defining member to open communication between the pressure chamber and the storage chamber when said sleeve is deformed and moves said valve member toward said pressure chamber.

9. The hydraulic brake booster of claim 8 in which said sleeve defines a flange having a tapered side edge, said flange defining said abutment cooperating with said abutment defined on said piston to oppose movement of said sleeve toward said pressure chamber, said flange being deformable relative to the remainder of said sleeve in response to pressure in the storage chamber above a predetermined value.

10. The hydraulic brake booster of claim 9 in which said passage in the piston defines a tapered portion which opposes the tapered side edge on said flange, and said tapered portion defining said abutment on said piston cooperating with said abutment defined on said flange, said tapered portion being normally spaced from the tapered side edge on said flange before the latter is deformed relative to the remainder of said sleeve.

11. In a hydraulic brake booster having a housing defining a pressure chamber, a movable piston mounted in the housing and defining a storage chamber within the piston, a control valve mounted in the housing, an operator actuator cooperating with the control valve to communicate pressurized fluid to the pressure chamber, and a valve member carried by the piston, the improvement in which said valve member comprises a unitary assembly for attachment with said piston, said unitary assembly providing for opening and closing communication between the pressure chamber and the storage chamber in response to a pressure differential across said unitary assembly, said unitary assembly including a sleeve which is disposed in a bore in said piston, a seat member carried by said sleeve and a stem extending through said seat member, said stem and seat member being movable relative to said sleeve when the pressure in the storage chamber is above a predetermined value to communicate the storage chamber with the pressure chamber, said stem being movable relative to said seat member and said sleeve when the pressure in the pressure chamber is greater than that in the storage chamber to communicate the pressure chamber with the storage chamber, and said stem cooperating with said seat member to close communication between the pressure chamber and the storage chamber when the pressure in the storage chamber is above the pressure in the pressure chamber but less than the predetermined value.

12. The hydraulic brake booster of claim 11 in which said sleeve supports a ring with an opening and said stem extends through the opening, the opening having a polygonal shape to radially support said stem and permit communication of fluid between said ring and stem.

13. The hydraulic brake booster of claim 11 or 12 in which said sleeve includes a flange with a tapered side facing said movable piston, said flange being deformable when excessive pressure builds up in the storage chamber to permit said sleeve to move relative to said movable piston and to move said stem relative to said sleeve and said seat member to communicate the storage chamber with the pressure chamber in order to vent the excessive pressure buildup in the storage chamber to the pressure chamber.

14. In a hydraulic brake booster having a housing defining a pressure chamber, a movable piston mounted in the housing and defining a storage chamber within the piston, a control valve mounted in the housing, an operator actuator cooperating with the control valve to communicate pressurized fluid to the pressure chamber, and a valve member carried by the piston, the improvement in which said valve member comprises a unitary assembly for attachment with said piston, said unitary assembly providing for opening and closing communication between the pressure chamber and the storage chamber in response to a pressure differential across said unitary assembly, said piston including a plug partially forming the storage chamber, said plug having a blind bore substantially disposed in the center of said plug for receiving said operator actuator, said plug having a passage which is radially disposed from and offset from the center of said plug and said valve member is disposed within said passage.

* * * * *